(12) United States Patent
Ota

(10) Patent No.: US 11,438,478 B2
(45) Date of Patent: Sep. 6, 2022

(54) PRINTING DEVICE

(71) Applicant: BROTHER KOGYO KABUSHIKI KAISHA, Nagoya (JP)

(72) Inventor: Yoshihiro Ota, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/196,106

(22) Filed: Mar. 9, 2021

(65) Prior Publication Data

US 2021/0306500 A1 Sep. 30, 2021

(30) Foreign Application Priority Data

Mar. 24, 2020 (JP) .............................. JP2020-052815

(51) Int. Cl.
*H04N 1/00* (2006.01)
*B41J 3/36* (2006.01)
*G06F 3/12* (2006.01)
*B41J 29/38* (2006.01)

(52) U.S. Cl.
CPC ............ *H04N 1/00888* (2013.01); *B41J 3/36* (2013.01); *B41J 29/38* (2013.01); *G06F 3/12* (2013.01)

(58) Field of Classification Search
None
See application file for complete search history.

(56) References Cited

FOREIGN PATENT DOCUMENTS

JP 2008-254285 A 10/2008
JP 2020138425 A * 9/2020

* cited by examiner

*Primary Examiner* — Fan Zhang
(74) *Attorney, Agent, or Firm* — Kenealy Vaidya LLP

(57) ABSTRACT

A printing device includes a battery, a print head and a controller. The battery is charged by a charging power and supplies a power to the print head. The controller has multiple operation modes and is configured to operate in one of the multiple operation modes. The controller consumes an operating power corresponding to the operation mode. An external power source has multiple power profiles and outputs a supplying power corresponding to one of the power profiles to the printing device. The supplying power is used as the operating power for driving the controller. The controller obtains the multiple power profiles from the externa power source. The controller determines whether the supplying power is greater than a sum of the charging power to charge the battery and the operating power, and determine an operation mode when the battery is being charged.

6 Claims, 9 Drawing Sheets

| POWER PROFILE No. | VOLTAGE | CURRENT | POWER | OPERATION MODE |
|---|---|---|---|---|
| 1 | 5V | 0.5A | 2.5W | SECOND, OR THIRD OPERATION MODE |
| 2 | 5V | 1.5A | 7.5W | SECOND, OR THIRD OPERATION MODE |
| 3 | 5V | 3A | 15W | FIRST OPERATION MODE |
| 4 | 9V | 3A | 27W | FIRST OPERATION MODE |
| 5 | 15V | 3A | 45W | FIRST OPERATION MODE |
| 6 | 20V | 5A | 100W | FIRST OPERATION MODE |

FIG. 2

|  | CPU | HIGH-SPEED CLOCK | LOW-SPEED CLOCK | COMMUNICATION FUNCTION | CLOCK SIGNAL INTERVAL | OPERATING POWER |
|---|---|---|---|---|---|---|
| FIRST OPERATION MODE | ALWAYS OPERATING | ALWAYS OPERATING | ALWAYS OPERATING | ENABLED | 100 ms | LARGE |
| SECOND OPERATION MODE | TEMPORARILY STOPEED | ALWAYS STOPPED | ALWAYS OPERATING | DISABLED | (CHARGING TIME) / 2 | MINIMUM |
| THIRD OPERATION MODE | TEMPORARILY STOPEED | ALWAYS STOPPED | ALWAYS OPERATING | DISABLED | (CHARGING TIME) / 10 | SMALL |
| CONSTANT OPERATION MODE | ALWAYS OPERATING | ALWAYS OPERATING | ALWAYS OPERATING | ENABLED | 100 ms | LARGE |

FIG. 3

PRINTING DEVICE

CROSS-REFERENCE TO RELATED APPLICATIONS

This application claims priority under 35 U.S.C. § 119 from Japanese Patent Application No. 2020-052815 filed on Mar. 24, 2020. The entire subject matter of the application is incorporated herein by reference.

BACKGROUND

Technical Field

The present disclosures relate to a printing device.

Related Art

There has been conventionally known a printing equipped with a controller and a secondary battery. The controller is configured to calculate the power required for printing based on printing data and printing conditions. The controller is further configured to obtain a charged amount of the secondary battery. The controller calculates, based on the power required for the printing and the charged amount of the secondary battery, a waiting time until the secondary battery is sufficiently charged so that printing of the print data can be performed.

SUMMARY

The conventional printing device as described above is typically configured such that the controller repeatedly obtains the charged amount of the secondary battery and calculates the waiting time while charging the secondary battery. Therefore, in the conventional printing device, the controller constantly consumes the power required to drive the device. Incidentally, when charging the secondary battery, there are cases where only a limited amount of power is supplied to the printing device, such as when the power is supplied through a USB standard cable. In such a case, the power consumed by the controller reduces the power needed to charge the secondary battery, and the waiting time tends to be increased.

According to aspects of the present disclosure, there is provided a printing device, comprising a print head configured to perform printing on a printing medium, a battery configured to be charged by a supplied power which is an electrical power supplied from an external power source, the battery being capable of supplying an electrical power to the print head, a supplied power amplitude obtaining device configured to obtain an amplitude of the supplied power, and a controller configured to operate in one operation mode of multiple operation modes with consuming an operating electrical power from the supplied power. The controller includes a comparing part configured to compare an amplitude of a total power that is a sum of an electrical power to charge the battery and the operating electrical power with an amplitude of the supplied power obtained by the supplied power amplitude obtaining device, and a mode determining part configured to determine an operation mode of the multiple operation modes when the battery is being charged based on a comparison result of the comparing part.

BRIEF DESCRIPTION OF THE DRAWINGS

FIG. 2 shows a conceptual configuration of an operation mode determination table.

FIG. 3 shows a conceptual configuration of an operation mode table.

DETAILED DESCRIPTION OF THE EMBODIMENT

Figure 1:
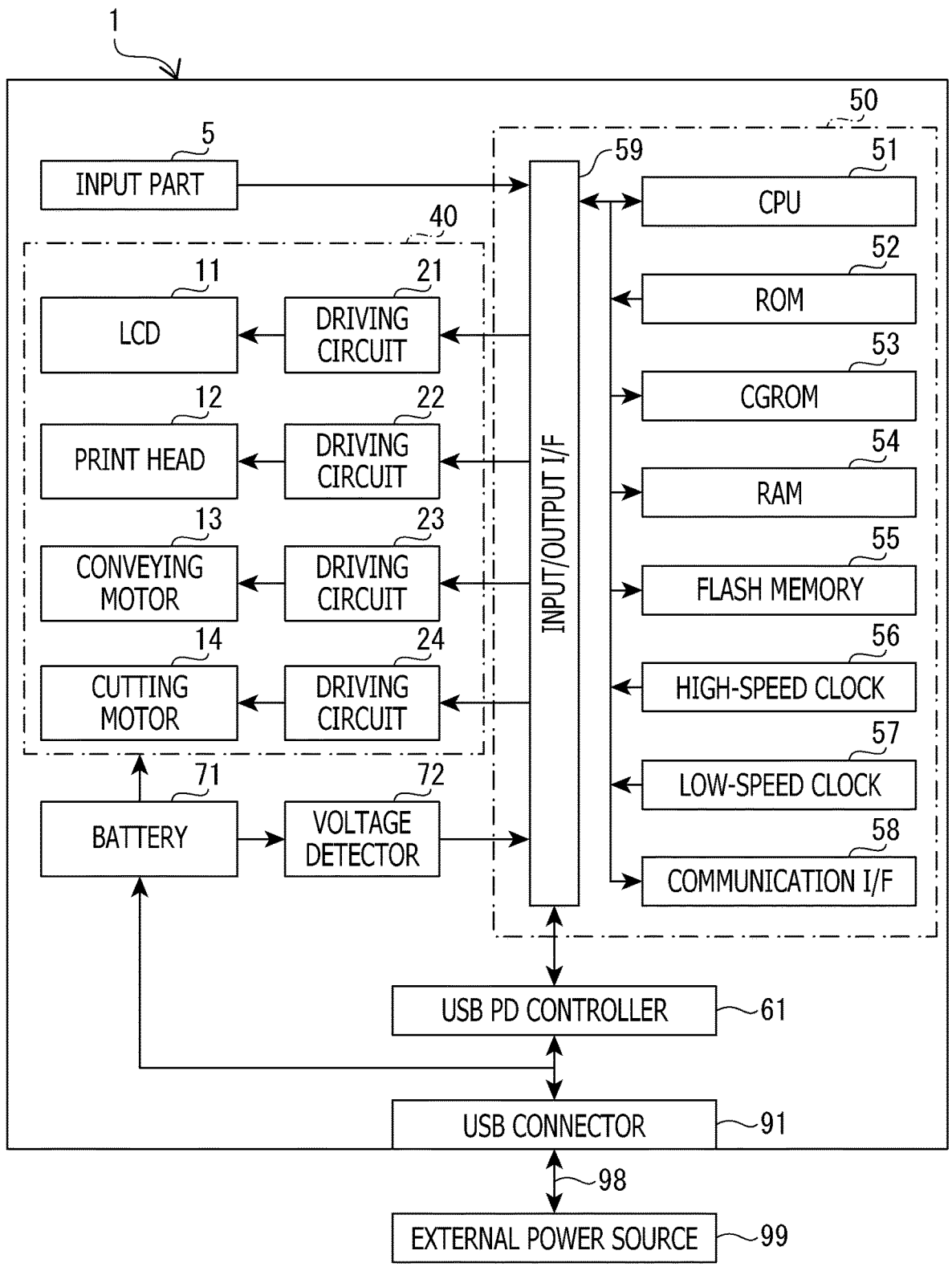
FIG. 1 is a block diagram showing an electrical configuration of a printing device.

Hereinafter, an embodiment according to the present disclosures will be described with reference to the accompanying drawings. The drawings to which reference is made illustrate technical features that may be employed according to aspects of the present disclosures. A configuration of the device described in the drawings is not intended to limit aspects of the present disclosures but is merely an illustrative example.

A printing device 1 is a thermal transfer printer that is driven by power supplied by a battery 71. The printing device 1 is configured to print characters (objects such as letters, symbols, numbers, and figures) on a printing medium (e.g., thermal labels).

Referring to FIG. 1, an electrical configuration of the printing device 1 will be described. The printing device 1 is provided with a controller 50 and a driver 40. The controller 50 is a microprocessor configured to control overall operation of the printing device 1. The controller 50 includes a CPU 51, a ROM 52, a CGROM 53, a RAM 54, a flash memory 55, a high-speed clock 56, a low-speed clock 57, a communication interface (hereinafter referred to as a communication I/F) 58, and an input/output interface (hereinafter referred to as input/output I/F). The ROM 52, the CGROM 53, the RAM 54, the flash memory 55, the high-speed clock 56, the low-speed clock 57, the communication I/F 58, and the input/output I/F 59 are each electrically connected to the CPU 51.

The CPU 51 is configured to perform operations based on various programs for controlling the printing device 1. The ROM 52 stores various parameters, the operation mode determination table 81 described below, the operation mode table 82 described below and the like, which are necessary for the CPU 51 to perform the operations. The CGROM 53 stores printing dot pattern data necessary for printing various characters. The RAM 54 temporarily stores flags, counters, calculation results, etc. The flash memory 55 stores various programs and the like necessary for controlling the printing device 1. The high-speed clock 56 and the low-speed clock 57 are each equipped with a transducer (well-known and not shown) and generates a clock signal of a particular frequency by oscillating the transducer and outputs the generated clock signal to the CPU 51. The frequency of the clock signal generated by the high-speed clock 56 is higher than the frequency of the clock signal generated by the low-speed clock 57. The communication I/F 58 includes a wireless communication module for connecting to a public network.

The CPU 51 performs various operations based on programs stored in the flash memory 55 in response to receiving the clock signals generated by the high-speed clock 56 and the low-speed clock 57. Based on the calculation results by the CPU 51, the controller 50 controls the driver 40 described below via various components provided to the controller 50 and the input/output I/F 59.

The driver 40 includes an LCD 11, a print head 12, a conveying motor 13, a cutting motor 14, and drive circuits 21 to 24. The LCD 11 is a liquid crystal display and is configured to display various pieces of information. The drive circuit 21 is an electronic circuit for driving the LCD 11. The print head 12 generates heat when driven and is configured to print on a printing medium. The drive circuit 22 is an electronic circuit for driving the print head 12. The conveying motor 13 operates a conveying mechanism (well-known and not shown) to discharge the printing medium after printing to the outside of the printing device 1. The drive circuit 23 is an electronic circuit for driving the conveying motor 13. The cutting motor 14 operates the cutting mechanism (well-known and not shown) by driving the same to cut the printing medium discharged to the outside of the printing device 1. The drive circuit 24 is an electronic circuit for driving the cutting motor 14. The drive circuits 21 to 24 are each electrically connected to the CPU 51 via the input/output I/F 59.

The printing device 1 further includes an input part 5, a USB connector 91, a USB PD controller 61, a battery 71, and a voltage detector 72. The input part 5, the USB PD controller 61, and the voltage detector 72 are each electrically connected to the CPU 51 via the input/output I/F 59. The input part 5 inputs various instructions to the controller 50 in response to user operations.

The USB connector 91 is a connection port for connecting to a USB device, such as an external power supply 99, via a cable 98, which is compliant with the USB PD standard. The external power supply 99 is, for example, a general-purpose personal computer, a mobile device, a tablet device, and the like. The external power supply 99 has multiple power profiles based on a power rules according to the USB PD standard. Each of the multiple power profiles has a corresponding power determined in advance. The external power supply 99 is configured to output a power corresponding to any one of the multiple power profiles.

The USB PD controller 61 is a module for communicating with the external power supply 99 in accordance with the USB PD standard. the USB PD controller 61 is electrically connected to the USB connector 91. When the external power supply 99 is connected to the USB connector 91, the CPU 51 obtains the multiple power profiles from the external power supply 99 via the PD controller 61. The CPU 51 determines the most appropriate one of the obtained multiple power profiles and transmits the determined power profile to the external power supply 99 via the USB PD controller 61. The external power supply 99 supplies the power corresponding to the power profile determined by the CPU 51 to the printing device 1.

A power (hereinafter referred to as a supplied power) supplied by the external power supply 99 is transmitted to the controller 50, the battery 71, and the like. The battery 71 is, for example, a lithium-ion battery or an electric double-layer capacitor. The battery 71 is charged by the supplied power. The battery 71 supplies power to drive the driver 40, the controller 50, and the like by discharging electric power. The voltage detector 72 detects the voltage of the battery 71. The voltage detector 72 then outputs a value of the detected voltage to the CPU 51 via the input/output I/F 59.

The controller 50 receives power from either the battery 71 or the external power supply 99 as the power supply source and operates. When the external power supply 99 is connected to the USB connector 91, the control portion 50 sets the power supply source as the external power supply 99. When the external power supply 99 is not connected to the USB connector 91, the controller 50 sets the power supply source to be the battery 71.

When the external power supply 99 is connected to the USB connector 91, the supplied power is used to charge the battery 71 and to drive the controller 50. In this embodiment, when the supplied power is used to charge the battery 71 (hereinafter referred to as a charging power) and the power to drive the controller 50 (hereinafter referred to as an operating power), the sum of the charging power and the operating power is at most 15 W.

When, for example, the external power supply 99 has power profiles No. 1 to No. 6 shown in FIG. 2, the printing device 1 can charge the battery 71 while driving the controller 50 by receiving the supplied power corresponding to the power profile No. 3.

On the other hand, there could be a case where the external power supply 99 has only power profiles No. 1 and No. 2 shown in FIG. 2. In such a case, the printing device 1 is unable to charge the battery 71 with the charging power and the controller 50 cannot be driven with consuming the operating power. In such a case, by reducing the amplitude of the charging power, the sum of the charging power and the operating power (hereinafter referred to as a total power) can be made smaller than the supplied power. In such a case, the controller 50 can be driven by consuming the operating power, but there is a problem that the time to charge the battery 71 is extended. In order to make it possible to charge the battery 71 without extending the time to charge the battery 71 even when the supplied power is less than the total power, the amplitude of the operating power consumed by the controller 50 may be reduced.

Referring to FIG. 3, modes in which the controller 50 is driven by consuming operating power will be described. The controller 50 is driven in any of the multiple operation modes in the operation mode table 82 stored in the ROM 52. Each of the plurality of operation modes has a different amplitude of operating power. The operation mode table 82 stores a first operation mode, a second operation mode, a third operation mode, and a steady-state operation mode as the operation modes of the controller 50. The first to third operation modes are the operation modes of the controller 50 when the external power supply 99 is connected to the USB connector 91 to charge the battery 71. The steady-state operation mode is the operation mode of the controller 50 when the battery 71 is not charged.

The operation mode table 82 stores the operation conditions of the CPU 51, operation conditions of the high-speed clock 56, the operation conditions of the low-speed clock 57, the settings of the communication function, and the clock signal interval in relation to respective operation mode.

The operation condition of the CPU 51 is a condition whether or not to supply power to the CPU 51. The operation condition of the CPU 51 is set to either "always operating" or "temporarily stopped." When the operation condition of the CPU 51 is "always operating," the power is constantly supplied to the CPU 51. When the operation condition of the CPU 51 is "temporarily stopped," the power is supplied to the CPU 51 only when the CPU 51 performs a process. When the CPU 51 is not performing any process, the CPU 51 stops operating. Intervals at which the CPU 51 performs a process are synchronized with the clock signal intervals. The operation condition of the CPU 51 in the first operation mode and the steady-state operation mode is "always operating," and the operation condition of the CPU 51 in the second operation mode and the third operation mode is "temporarily stopped." Therefore, the power consumption of the CPU 51 in the second and third operation modes is less than the power consumption of the CPU 51 in the first operation mode and the steady-state operation mode.

The operation condition of the high-speed clock 56 is a condition of whether or not to supply power to the high-speed clock 56. The operation condition of the high-speed clock 56 is set to either "always operating" or "constantly stopped." When the operation condition of the high-speed clock 56 is "always operating," power is always supplied to the high-speed clock 56. When the operation condition of the high-speed clock 56 is "constantly stopped," power is not supplied to the high-speed clock 56. The operation condition of the high-speed clock 56 in the first operation mode and the steady-state operation mode is "always operating," and the operation condition of the high-speed clock 56 in the second operation mode and the third operation mode is "constantly stopped." Therefore, the power consumption of the high-speed clock 56 in the second and third operation modes is less than the power consumption of the high-speed clock 56 in the first operation mode and the steady-state operation mode.

The operation condition of the low-speed clock 57 is a condition for whether or not to supply power to the low-speed clock 57. The operation condition of the low-speed clock 57 is set to "always operating." In the second and third operation conditions, the CPU 51 executes a process in synchronization with the clock signal generated by the low-speed clock 57.

The setting of the communication function is the setting of the wireless communication by the communication I/F 58. It is noted that the communication function is set to be "enabled" or "disabled." When the setting of the communication function is "enabled," the controller 50 can execute the wireless communication via the communication I/F 58. When the setting of the communication function is "disabled," the controller 50 cannot execute the wireless communication via the communication I/F 58. The setting of the communication function in the first operation mode and the steady-state operation mode is valid, while the setting of the communication function in the second operation mode and the third operation mode is invalid. Therefore, the power consumption of the communication I/F 58 in the second and third operation modes is less than the power consumption of the communication I/F 58 in the first operation mode and the steady-state operation mode.

The clock signal interval is an interval, in which one of the high-speed clock portions 56 and the low-speed clock 57 having a shorter interval for generating the clock signal, generates a clock signal. In the first operation mode and the steady-state operation mode, the operation condition of the high-speed clock 56 is "always operating," and the clock signal interval is the interval at which the high-speed clock 56 generates the clock signal. The high-speed clock 56 generates a clock signal at an interval of 100 milliseconds. In the first operation condition, the CPU 51 obtains and monitors the voltage of the battery 71 at the time of charging, which is detected by the voltage detector 72, in synchronization with the clock signal interval.

In the second and third operation modes, the clock signal interval is the interval at which the low-speed clock 57 generates a clock signal, since the operation condition of the high-speed clock 56 is "constantly stopped." The clock signal interval in the second operation mode is one-half of the charging time, and the clock signal interval in the third operation mode is one-tenth of the charging time. The charging time is a prediction of the time from the time that the external power supply 99 connects to the USB connector 91 and the battery 71 starts charging to the time that the battery 71 is fully charged. An explanation of the method of predicting the charging time is described below.

In the second and third operation modes, the CPU 51 obtains and monitors the voltage of the battery 71 at the time of charging, which is detected by the voltage detector 72, in synchronization with the clock signal interval. The clock signal interval in the second operation mode is longer than the clock signal interval in the third operation mode. Since the interval at which the CPU 51 monitors the voltage of the battery 71 is longer, the power consumption of the CPU 51 in the second operation mode is less than the power consumption of the CPU 51 in the third operation mode.

From the above, in the operation mode in the present embodiment, the operating power is greater in the order of the second operation mode<the third operation mode<the first operation mode=the steady-state operation mode. When the external power supply 99 is connected to the USB connector 91, the printing device 1 operates in the first operation mode, which is the same operating power as the steady-state operation mode, when the supplied power is greater than or equal to the total power, and operates in one of the second and third operation modes when the supplied power is less than the total power. The second and third operation modes differ in the length of the interval at which the CPU 51 monitors the voltage of the battery 71, due to the difference in the clock signal interval between the second and third operation modes.

Figure 4A:
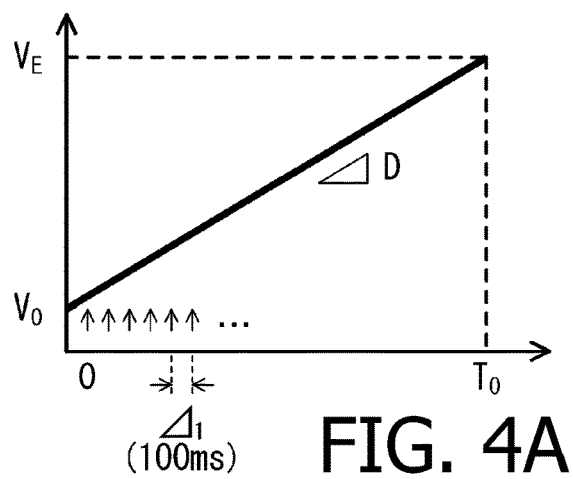
FIG. 4A-4E illustrate a change in voltage of a battery during charging and monitoring of the voltage of the battery by a CPU.

Referring to FIG. 4A-4E, the change in the voltage of the battery 71 during charging and the interval of monitoring of the voltage of the battery 71 by the CPU 51 will be described. FIG. 4A shows the change in voltage of the battery 71 when charging the battery 71 at voltage V0 to voltage VE. The voltage of the battery 71 increases in proportion to time. Therefore, the printing device 1 can predict the charging time T0 at the start of charging by the voltages V0, VE, and the change amount D in voltage per time. The amplitude of the change amount D is based on the amplitude of the charging power. In this embodiment, the amplitude of the change is of a particular amplitude because the amplitude of the charging power does not vary. The ROM 52 stores a value of the change amount D in advance.

The CPU 51 predicts the voltage of the battery 71 and obtains the voltage of the battery 71 detected by the voltage detector 72 at every period of the clock signal interval. The CPU 51 monitors the voltage of the battery 71 by comparing the prediction of the voltage of the battery 71 with the obtained voltage of the battery 71. Based on the results of the monitoring, the time remaining until the battery 71 is fully charged (hereinafter referred to as a "remaining time") is updated and displayed on the LCD 11.

When the supplied power is greater than or equal to the total power, the CPU 51 operates in the first operation mode, where the clock signal interval is 100 milliseconds. The CPU 51 obtains the voltage of the battery 71, which is detected by the voltage detector 72 at 100 millisecond intervals. The CPU 51 then predicts the voltage of the battery 71 to be obtained this time based on the previously obtained voltage of the battery 71 and the change amount D.

When the predicted voltage of the battery 71 and the voltage of the battery 71 detected by the voltage detector 72 are the same, the CPU 51 subtracts the time elapsed since charging was started from the charging time T0 and displays the same on the LCD 11 as the remaining time. A case where the voltage of the battery 71 predicted and the voltage of the battery 71 detected by the voltage detector 72 differs from the voltage of the battery 71 will be described later. It is noted that, in the present embodiment, the charging time T0 is about several hundred seconds. Therefore, the interval for updating the remaining time (100 millisecond interval) is sufficiently short with respect to the charging time T0.

Figure 4B:
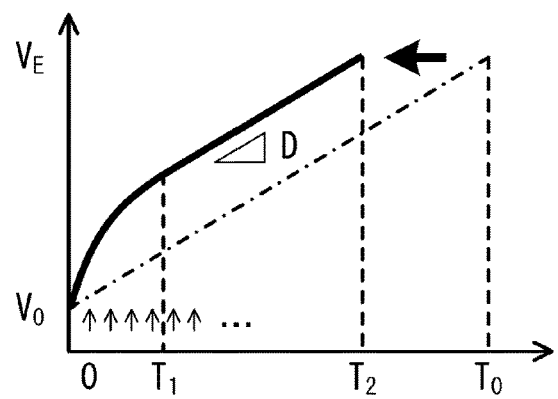

FIG. 4B shows the change in voltage of battery 71 when the battery 71 is charged from voltage V0 to voltage VE immediately after printing. In present embodiment, a period between the end of printing at which the printing by the print head 12 is completed and the elapse of 300 seconds is referred to as a period immediately after printing. The battery 71 immediately after printing recovers from a temporary drop in voltage due to the battery 71 supplying power to the print head 12. Therefore, the change amount in the voltage per time of battery 71 immediately after printing is greater than the change amount D (before time T1). As the voltage of battery 71 recovers, the change amount in voltage per time approaches the change amount D. After the voltage of battery 71 recovers from the temporary drop (after time T1), the voltage of battery 71 rises in proportion to time with the change amount D. Therefore, the charging of battery 71 immediately after printing is completed in time T2 which is shorter than the charging time T0 in the case of not immediately after printing.

When the supplied power is greater than or equal to the total power, the CPU 51 operates in the first operation mode, where the clock signal interval is 100 milliseconds. When the CPU 51 monitors the voltage of the battery 71 immediately after printing, as in a case where the battery 71 is charged not immediately after printing (see FIG. 4A), the CPU 51 obtains the voltage of the battery 71 detected by the voltage detector 72 using the clock signal interval as the period. The CPU 51 predicts the voltage of the battery 71 to be obtained this time based on the voltage of the battery 71 obtained last time and the change amount D per unit time.

Figure 4C:
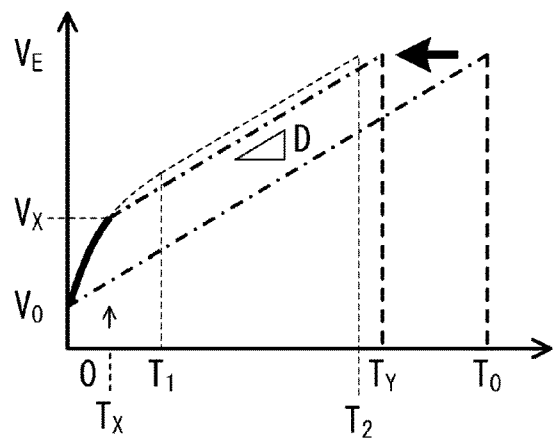

Before the voltage of battery 71 recovers from a temporary drop (before time T1), the voltage change per unit time is greater than the change amount D, so that the voltage of battery 71 detected by voltage detector 72 is greater than the predicted voltage of battery 71. As shown in FIG. 4C, when the voltage detector 72 detects voltage VX at time TX before the voltage of the battery 71 recovers, the CPU 51 predicts the charging time TY assuming that the voltage rises in proportion to time after time TX. Then, the CPU 51 calculates the remaining time from the difference between time TY and time TX and displays the remaining time on the LCD 11.

An interval for monitoring the voltage of the battery 71 by CPU 51 in the case where the supplied power is less than the total power will be described. When the supplied power is less than the total power, the CPU 51 operates in the second operation mode if charging of the battery 71 is performed not immediately after printing, while the CPU 51 operates in the third operation mode if charging of the battery 71 is performed immediately after printing.

Figure 4D:
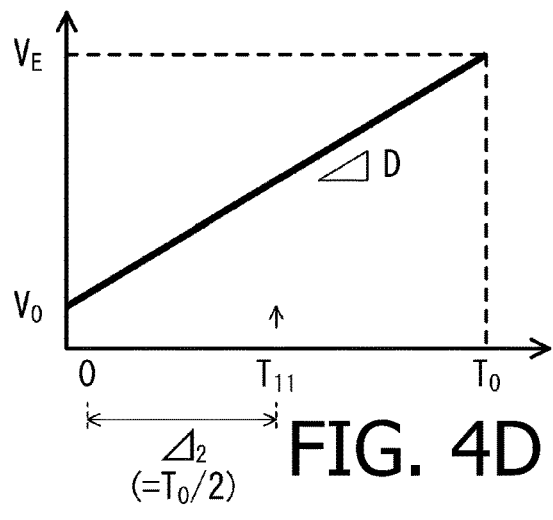

FIG. 4D shows an interval for monitoring the voltage of the battery 71 by the CPU 51 when charging the battery 71 from voltage V0 to voltage VE when the power supplied is less than the total power and not immediately after printing. In the second operation mode, the clock signal interval is half the charging time T0. The CPU 51 uses the clock signal interval as a period to compare the predicted voltage of the battery 71 with the voltage of the battery 71 obtained from the voltage detector 72. That is, the CPU 51 compares the voltage of the battery 71 only three times: at the start of charging, at the elapse of half of the charging time T0, and at the elapse of the charging time T0.

In the second operation mode, the operation condition of the CPU 51 is "temporarily stopped," and the CPU 51 is powered only when the CPU 51 compares the predicted voltage of the battery 71 with the voltage of the battery 71 obtained. When the CPU 51 finishes the comparison, the CPU 51 stops operating until the clock signal is generated by the low-speed clock 57 next time.

Figure 4E:
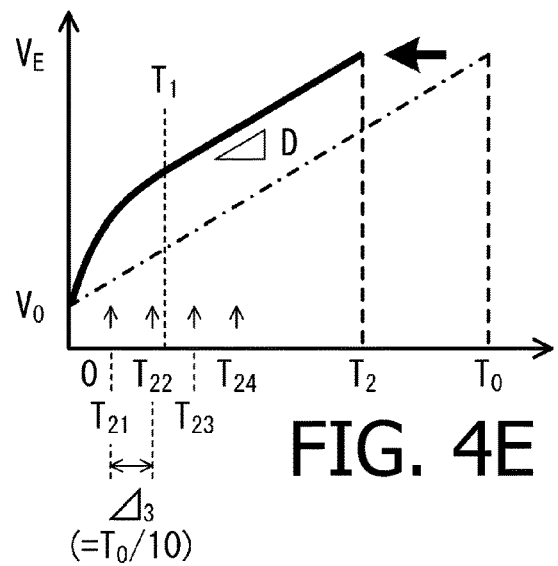

FIG. 4E shows an interval for monitoring the voltage of the battery 71 by CPU 51 when charging the battery 71 from voltage V0 to voltage VE when the power supplied is less than the total power and immediately after printing. In the third operation mode, the clock signal interval is a tenth of the charging time T0. The CPU 51 compares the predicted voltage of the battery 71 with the voltage of the battery 71 obtained from the voltage detector 72 at times T21, T22, T23, and T24, using the clock signal interval as the period.

During a time period between times T22 and T23, time T1, at which the voltage of battery 71 recovers from a temporary drop, has past, and after time T1, the voltage of battery 71 rises in proportion to time with the amplitude D of the change per unit time. Therefore, at time T24, the value predicted from the voltage of the battery 71 at time T23 is the same as the voltage of the battery 71 actually obtained from the voltage detector 72.

In the third operation mode, the operation condition of the CPU 51 is "temporarily stopped," and the CPU 51 is powered only when the CPU 51 compares the predicted voltage of the battery 71 with the voltage of the battery 71 obtained. When the CPU 51 finishes the comparison, the CPU 51 stops operating until the clock signal is generated by the low-speed clock 57 next time.

Referring to FIG. 2, the operation mode determination table 81 stored in the ROM 52 will be described. The operation mode determination table 81 stores multiple power profiles that can be received based on power rules in the USB PD standard and the operation modes of the controller 50 in an associated manner. The CPU 51 obtains the power profile of the external power supply 99 in an operation mode determining process described below, and stores the power profile of the external power supply 99 in the operation mode determination table 81. The operation mode at the time of charging the battery 71 is determined based on the operation mode determination table 81.

Figure 5:
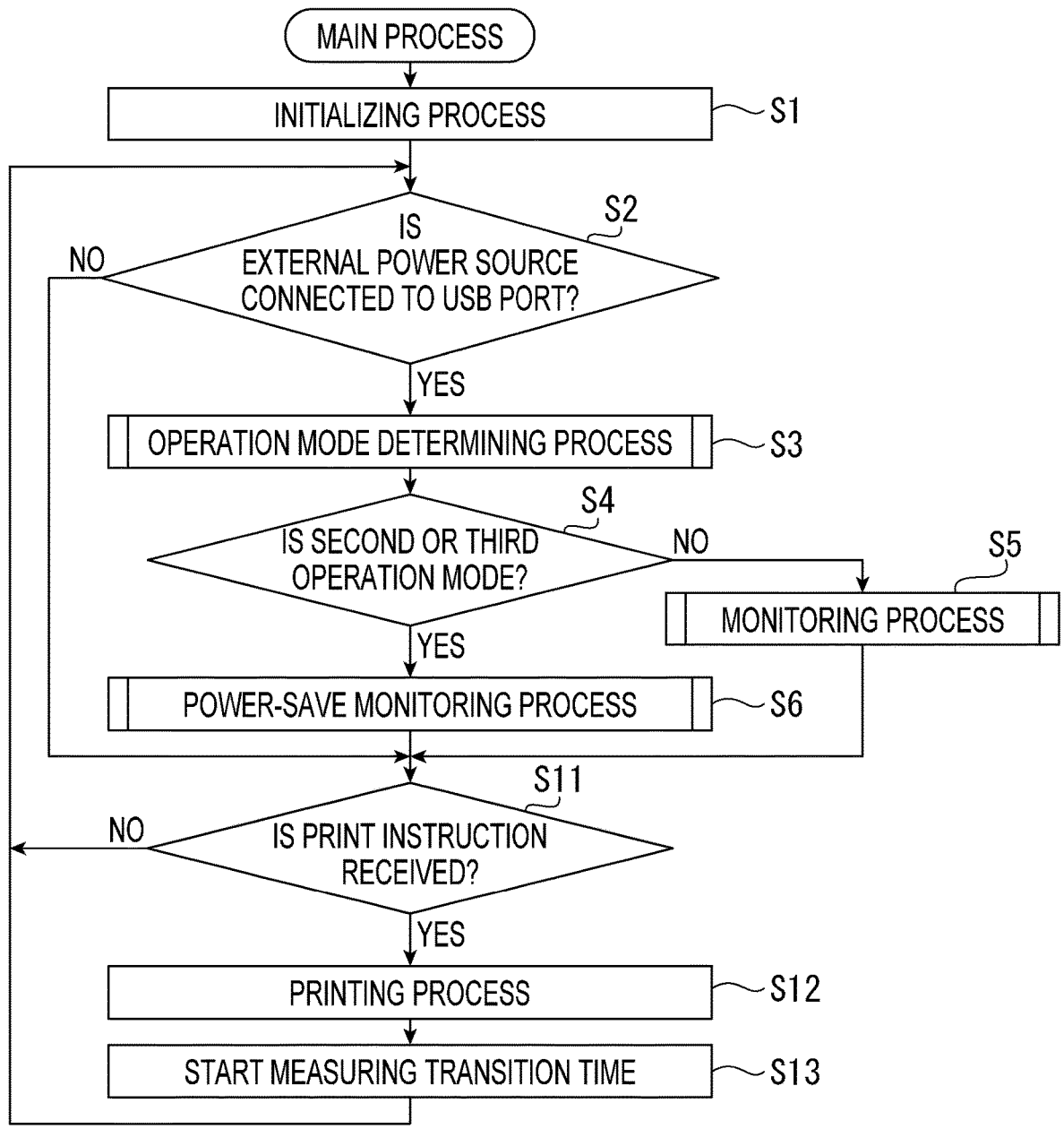
FIG. 5 shows a flowchart illustrating a main process.

Referring to FIG. 5, a main process will be described. The main process is for performing printing with the print head 12 and for charging the battery 71 when the external power supply 99 is connected. In the following description, for convenience of explanation, each process performed by the CPU 51 will be described as being performed by the controller 50.

Flags and Counters used in the main process are explained. It is noted that a power saving flag, a transition time counter, an elapsed time counter and the like are stored in the RAM 54. The power saving flag is set to "1," which represents "ON" status of the power saving mode, when the operation mode of the controller 50 is one of the second and third operation modes. Further, the power saving flag is set to "0," which represents "OFF" status of the power saving mode, when the operation mode of the controller 50 is one of the steady-state operation mode and the first operation mode. At the start of the main process, the power saving flag is "0" representing the OFF status. The transition time counter is a timer counter for measuring a transition time, which is a time that has elapsed since the printing by the print head 12 has ended. The elapsed time counter is a time counter for measuring the elapsed time, which is the time that has elapsed since charging of the battery 71 started.

The main process is started by the controller 50 executing the program stored in the flash memory 55 when the printing device 1 is powered on. When the main process is started, the controller 50 executes an initial processing (S1). In the initial processing, the controller 50 sets the operation mode to the steady-state operation mode. In the initial processing, the controller 50 clears information stored in RAM 54 and sets the power saving flag to "0" (i.e., the OFF status).

The controller 50 determines whether the external power supply 99 is connected to the USB connector 91 via the cable 98 (S2). When it is determined that the external power supply 99 is not connected to the USB connector 91 (S2: NO), the controller 50 determines whether a print instruction is received or not (S11). When printing is to be performed with the print head 12, the user operates the input part 5 to input the print instruction. The input part 5 then outputs the print instruction to the controller 50. When it is determined that the print instruction is received (S11: YES), the controller 50 performs a printing process so that printing is performed with the print head 12 (S12). After executing the printing process, the controller 50 starts measuring the transition time with the transition time counter (S13) and returns the process to S2. When it is determined that no print instruction is received (S11: NO), the controller 50 returns the process to S2.

When it is determined that the external power supply 99 is connected to the USB connector 91 (S2: YES), the controller 50 performs the operation mode determining process (S3).

Figure 6A:
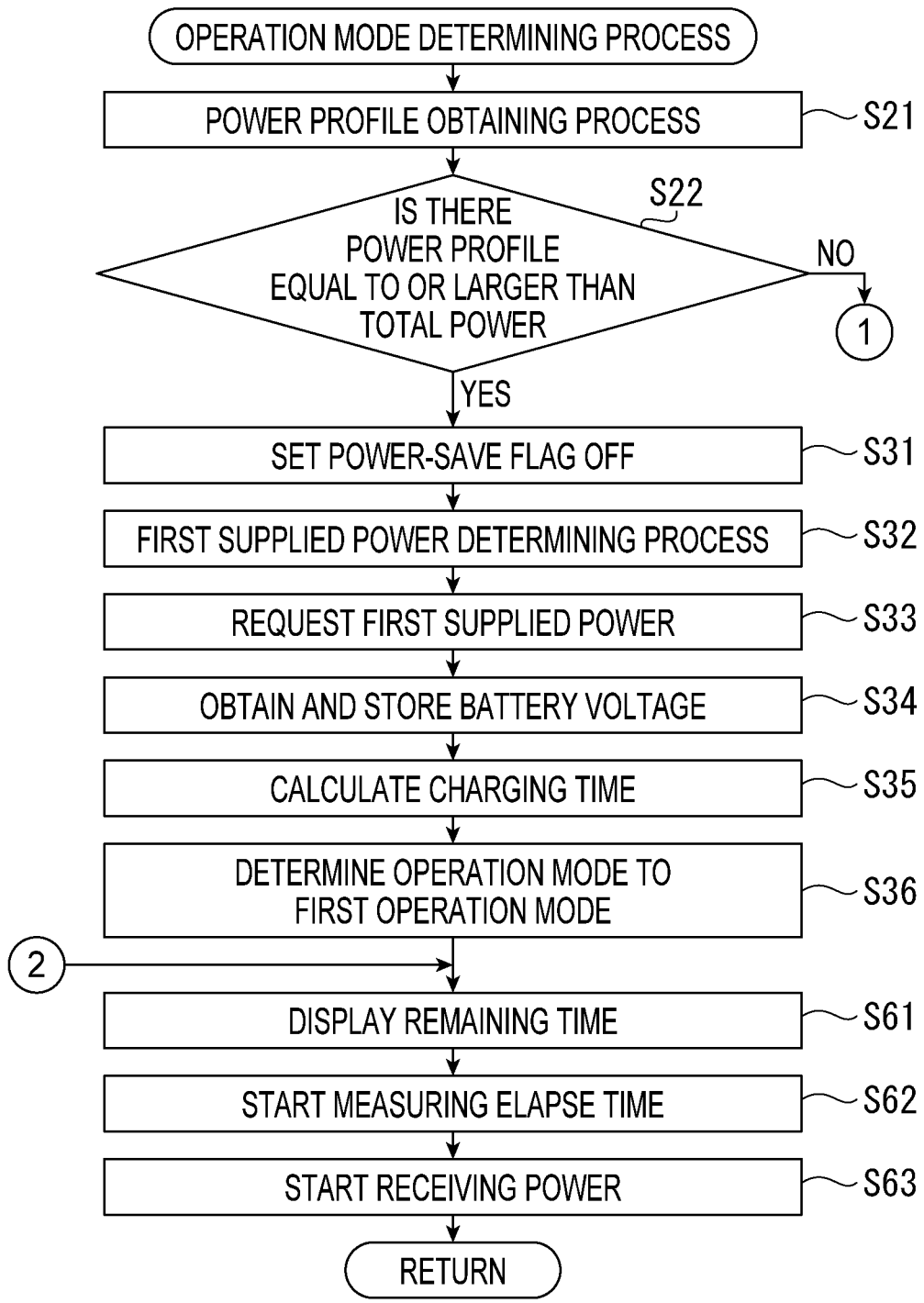
FIGS. 6A and 6B show a flowchart illustrating an operation mode determining process.
Figure 6B:
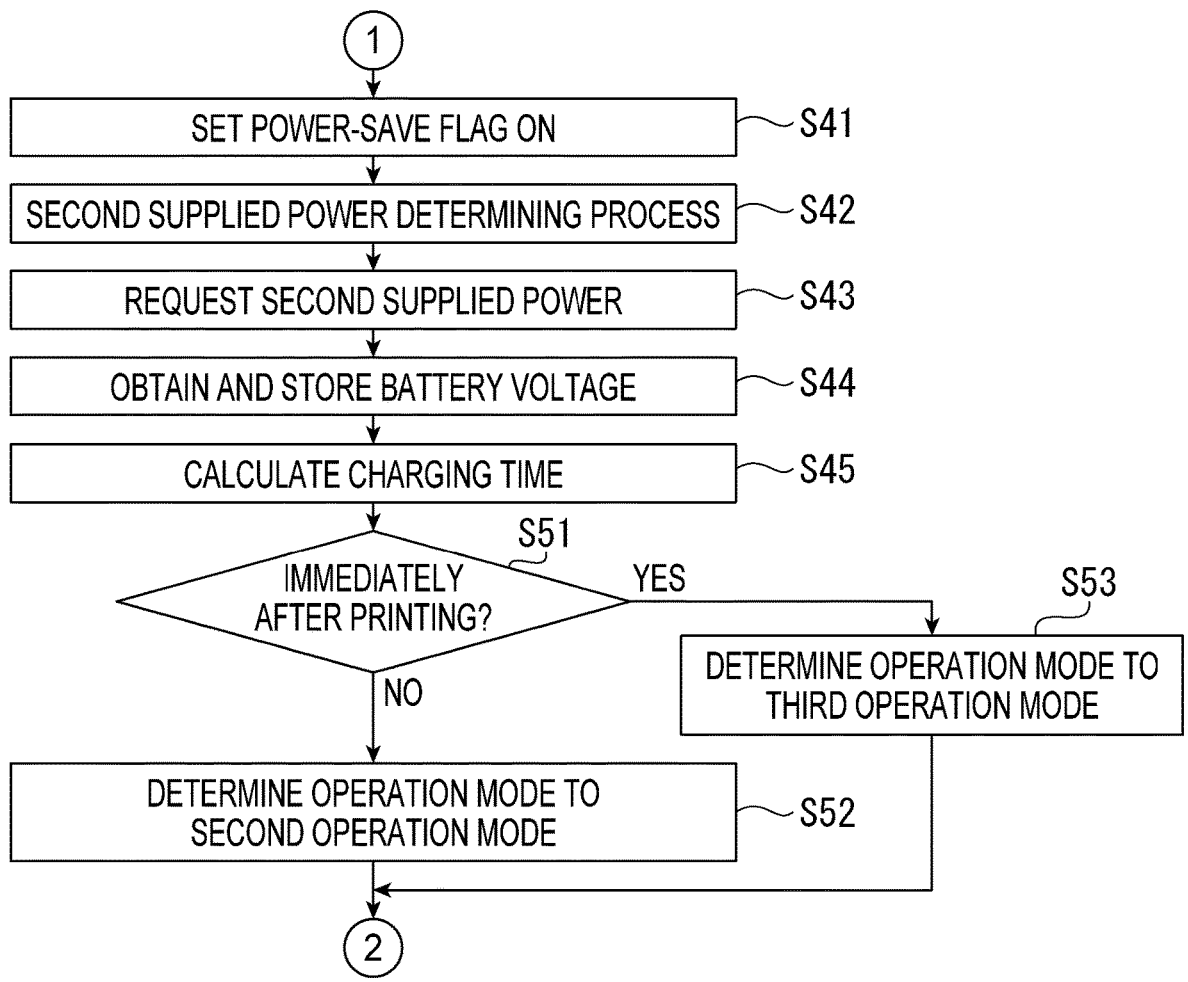

Referring to FIGS. 6A and 6B, the operation mode determining process called in the main process will be described. The operation mode determining process is for determining the operation mode of the controller 50 according to the power profile possessed by the external power supply 99.

When the operation mode determining process is started, the controller 50 obtains the power profile possessed by the external power supply 99 via the USB PD controller 61 (S21). The controller 50 then determines whether the supplied power corresponding to the power profile obtained in S21 is greater than or equal to the total power (S22). In S22, the controller 50 refers to the operation mode determination table 81 (see FIG. 2) and determines whether or not the supplied power corresponding to the power profile as obtained is greater than or equal to 15 W, which is the maximum value of the total power, among the obtained power profiles.

When there is a power profile corresponding to the total power (15 W) or more among the obtained power profiles (S22: YES), the controller 50 sets the power saving flag to "OFF" (S31). It is noted that S31 is also executed when the power saving flag is already OFF.

Next, the controller 50 performs the first supply power determination process (S32). In the first supply power determination process, the controller 50 determines the power corresponding to the power profile with the smallest power among the power profiles corresponding to the power of 15 W or more as a first supply power. For example, if the external power supply 99 has power profiles No. 1 to No. 6 in the operation mode determination table 81, the power of power profile No. 3 is determined as the first supply power.

The controller 50 requests the external power supply 99 via the USB PD controller 61 to supply the first supply power determined in S32 (S33). The external power supply 99 is set to output the first supply power. Next, the controller 50 obtains the voltage of the battery 71 from the voltage detector 72 and stores it in the RAM 54 (S34). The controller 50 calculates the charging time from the voltage of the battery 71 as obtained, the voltage at full charge, and the change amount D (S35). The controller 50 then determines the operation mode to be the first operation mode (S36) and moves the process to S61.

On the other hand, when there is no power profile corresponding to the total power (15 W) or more in the obtained power profile (S22: NO), the controller 50 sets the power saving flag to "ON" (S41). It is noted that S41 is also executed when the power saving flag is already "ON."

Next, the controller 50 executes the second supply power determination process (S42). In the second supply power determination process, the controller 50 determines the power corresponding to the power profile that has the largest power among the power profiles as the second supply power. For example, if the external power supply 99 has power profiles No. 1 and No. 2 of the operation mode determination table 81, the power of power profile No. 2 is determined as the second supply power.

The controller 50 requests the external power supply 99 via the USB PD controller 61 to supply the second supply power determined in S42 (S43). The external power supply 99 is set to output the second supply power. Next, the controller 50 obtains the voltage of the battery 71 from the voltage detector 72 and stores it in the RAM 54 (S44). The controller 50 calculates the charging time from the obtained voltage of the battery 71, the voltage at full charge, and the change amount D (S44).

Next, the controller 50 determines whether or not the printing device 1 is in a state immediately after printing (S51). In S51, the controller 50 makes the determination based on the value of the transition time counter that started measuring the transition time in S13. When it is determined that 300 seconds have elapsed since the start of timing the transition time and the printing device 1 is not in the state immediately after printing (S51: NO), the controller 50 determines the operation mode to be the second operation mode (S52) and moves the process to S61. When 300 seconds have not passed since the start of timing the transition time, and the printing device 1 is immediately after printing (S51: YES), the controller 50 determines the operation mode to the third operation mode (S53) and moves the process to S61.

In S61, the controller 50 displays the remaining time on the LCD 11. Since it is before the start of charging, the remaining time displayed by the LCD 11 is equal to the charging time. The controller 50 starts measuring the elapsed time with the elapsed time counter (S62). The controller 50 instructs the external power supply 99 to supply the power requested in S33 or S43 via the USB PD controller 61 and starts receiving the power from the external power supply 99 (S63). The controller 50 returns the processing to the main process (see FIG. 5).

As shown in FIG. 5, after the operation mode determining process (S3) is performed, the controller 50 determines whether the controller 50 is to operate in either the second or third operation mode (S4). In S4, the controller 50 makes the determination based on the value of the power saving flag set in S31 (see FIG. 6A) or S41 (see FIG. 6B). When the power saving flag is "OFF," and the controller 50 is to operate in the first operation mode (S4: NO), the controller 50 performs the monitoring process (S5) and moves the process to S11. When the power saving flag is "ON," and the controller 50 is to operate in either the second or third operation mode (S4: YES), the controller 50 performs the power-save monitoring process (S6) and moves the processing to S11.

Figure 7:
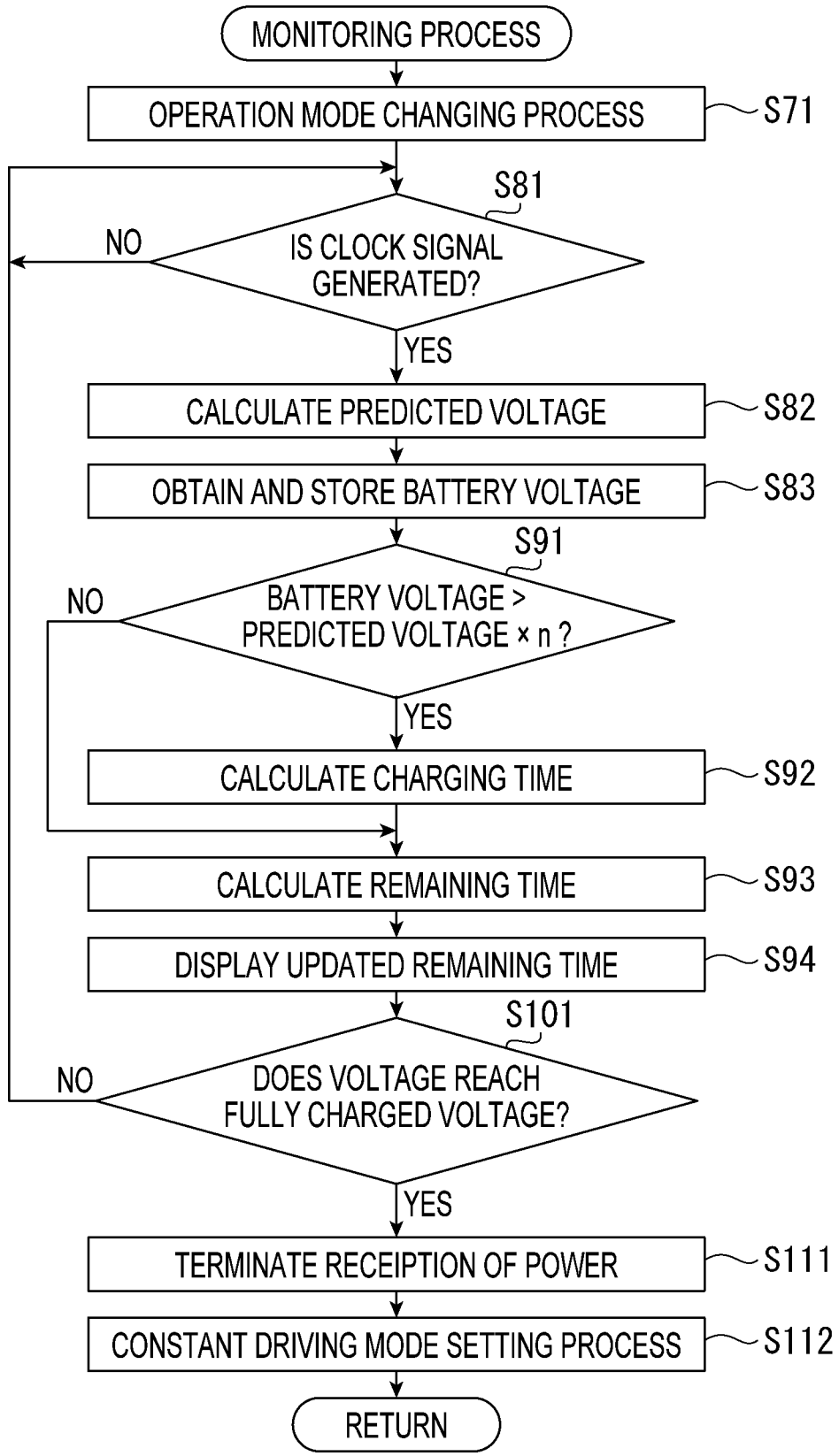
FIG. 7 shows a flowchart illustrating a monitoring process.

Referring to FIG. 7, the monitoring process called in the main process will be described. The monitoring process is for performing the monitoring of the voltage of the battery 71 when the controller 50 operates in the first operation mode.

When the monitoring process is started, the controller 50 performs an operation mode change process (S71). In S71, the controller 50 changes the operation mode from the steady-state operation mode to the first operation mode determined in S35.

Next, the controller 50 determines whether the high-speed clock 56 has generated the clock signal (S81). The controller 50 determines that the high-speed clock 56 has generated the clock signal in response to the high-speed clock 56 outputting an electrical signal. The controller 50 waits until the high-speed clock 56 generates the clock signal (S81: NO).

When the high-speed clock 56 generates the clock signal (S81: YES), the controller 50 calculates the predicted voltage, which is a predicted value of the voltage of the battery 71, based on the last obtained voltage of the battery 71 and the change amount D in voltage per unit time, which are stored in the RAM 54 (S82). The controller 50 then obtains the voltage of the battery 71 from the voltage detector 72 with the CPU 51 and stores the obtained voltage of the battery 71 in the RAM 54 (S83).

The controller 50 then determines whether the voltage of the battery 71 obtained in S83 is greater than n times the predicted voltage calculated at S82 (S91), where n is a particular number greater than or equal to 1. When the voltage of the battery 71 obtained in S83 is not greater than n times the predicted voltage (S91: NO), the controller 50 calculates the remaining time (S93) by subtracting the elapsed time of the elapsed time counter from the charging time, and displays the remaining time on the LCD 11 (S94) assuming that the battery 71 completes charging in the charging time predicted in S35 as in the case of FIG. 4A (see FIG. 6A). It is noted that the controller 50 displays the remaining time on the LCD 11 with truncating the decimal point in the remaining time.

When the voltage of battery 71 obtained at S83 is greater than n times the predicted voltage (S91: YES), as in the case of FIG. 4B, the controller 50 will use the voltage of battery 71 obtained at S83, the voltage at full charge, and the change amount D to re-calculate the charging time (S92) assuming that charging of battery 71 is completed earlier than the charging time predicted in S35. The controller 50 calculates the remaining time by subtracting the elapsed time of the elapsed time counter from the re-calculated charging time (S93), and displays the remaining time on the LCD 11 (S94).

Next, the controller 50 determines whether the voltage of the battery 71 obtained in S83 has reached the voltage at full charge (S101). When the voltage of the battery 71 has not reached the voltage at the time of full charge (S101: NO), the controller 50 returns the process to S81. When S81 to S101 are repeatedly executed and the voltage of the battery 71 has reached the voltage at the time of full charge (S101: YES), the controller 50 instructs the external power supply 99 so that the receiving of power, via the USB PD, from the external power supply 99 via the USB PD controller 61 to end, thereby receiving of power being ended (S111). The controller 50 performs the steady-state operation mode setting process and changes the operation mode from the first operation mode to the steady-state operation mode (S112). The controller 50 then returns the process to the main process (see FIG. 5).

Figure 8:
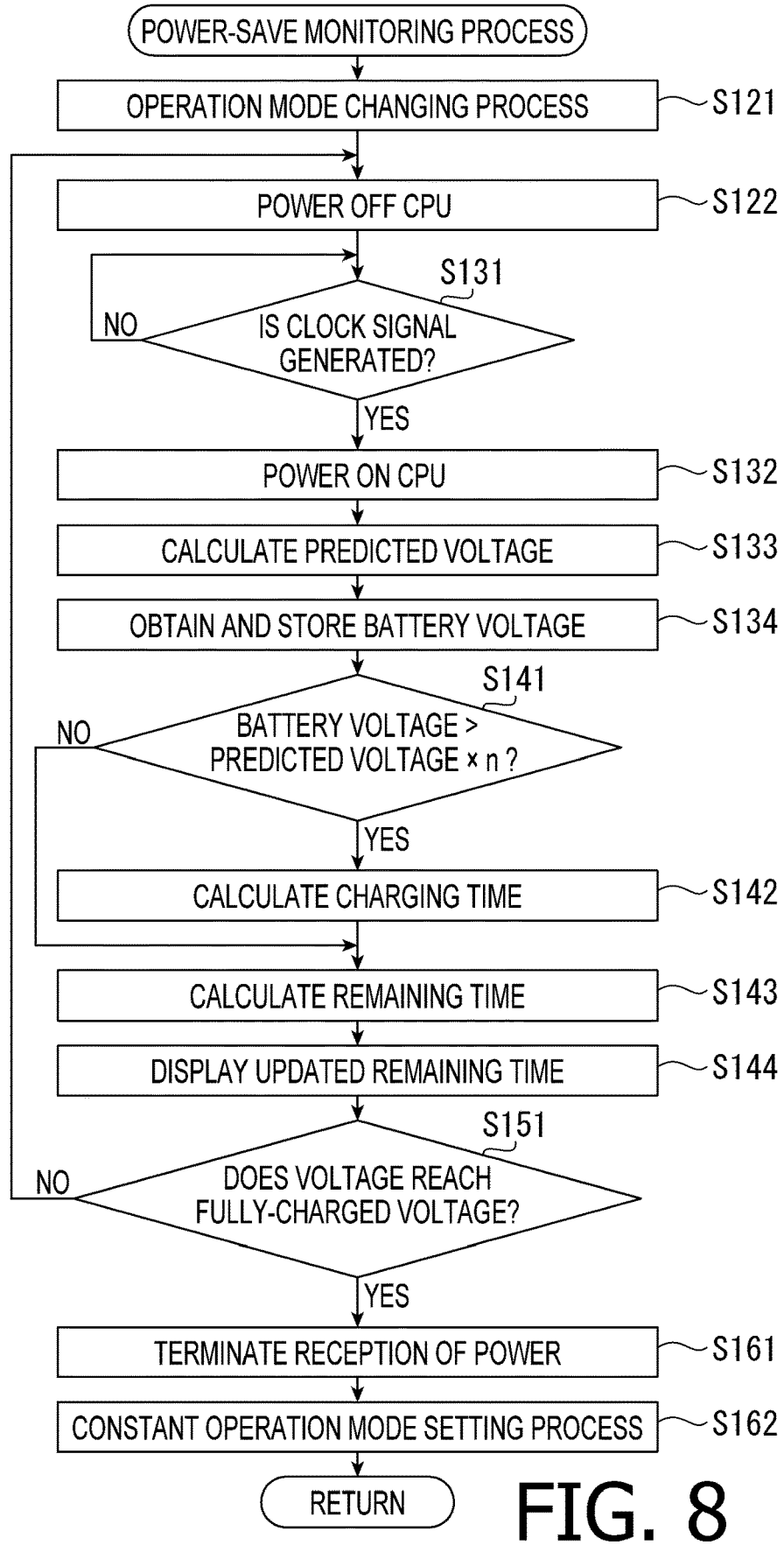
FIG. 8 shows a flowchart illustrating a power-save monitoring process.

Referring to FIG. 8, the power-save monitoring process called in the main process will be described. The power-save monitoring process is a process for performing the monitoring of the voltage of the battery 71 when the controller 50 operates in the second operation mode or the third operation mode.

When the power-saving monitoring process is started, the controller 50 performs the operation mode change process (S121). In S121, the controller 50 changes the operation mode from the steady-state operation mode to the second operation mode determined in S52, or the third operation mode determined in S53. In accordance with the change of the operation mode, the controller 50 stops supplying power to the high-speed clock 56, sets the high-speed clock 56 to "constantly stopped," and disables the setting of the wireless communication by the communication I/F 58. Next, the controller 50 stops the power supply to the CPU 51 and sets the CPU 51 to "temporarily stopped" (S122).

The controller 50 determines whether the low-speed clock 57 has generated the clock signal (S131). The controller 50 determines that the low-speed clock 57 has generated a clock signal in response to the low-speed clock 57 outputting the electrical signal. The controller 50 waits until the low-speed clock 57 generates the clock signal (S131: NO).

When the low-speed clock 57 generates the clock signal (S131: YES), the controller 50 supplies power to the CPU 51 to drive the CPU 51 (S132). Next, the controller 50 calculates the predicted voltage of the battery 71 from the last obtained voltage of the battery 71 and the change amount D that is stored in the RAM 54 (S133). The controller 50 then obtains the voltage of the battery 71 from the voltage detector 72 with the CPU 51 and stores the voltage of the battery 71 in the RAM 54 (S134).

The controller 50 determines whether the voltage of the battery 71 obtained in S134 is greater than n times the predicted voltage calculated in S133 (S141). When the voltage of the battery 71 obtained in S134 is not greater than n times the predicted voltage (S141: NO), as in the case of FIG. 4D, the controller 50 subtracts the elapsed time of the elapsed time counter from the charging time, calculates the remaining time (S143), and displays the remaining time on the LCD 11 (S144) assuming that the charging is completed in the charging time predicted in S45 (see FIG. 6B). It is noted that the controller 50 displays the remaining time on the LCD 11 with truncating the decimal point in the remaining time.

When the voltage of battery 71 obtained at S134 is greater than n times the predicted voltage (S141: YES), as in the case of FIG. 4E, the controller 50 re-calculate the charging time based on the voltage of battery 71 obtained at S134, the voltage at full charge, the change amount D (S142) assuming that charging of battery 71 is completed earlier than the charging time predicted in S45. The controller 50 subtracts the elapsed time of the elapsed time counter from the re-calculated charging time to calculate the remaining time (S143), and displays the remaining time on the LCD 11 (S144).

Next, the controller 50 determines whether the voltage of the battery 71 obtained in S134 has reached the voltage at full charge (S151). When the voltage of the battery 71 has not reached the voltage at full charge (S151: NO), the controller 50 returns the process to S122. The controller 50 stops supplying power to the CPU 51 and sets the status of the CPU 51 to "temporarily stopped" again (S122).

When S122 to S151 are repeatedly executed and the voltage of battery 71 reaches the voltage at full charge (S151: YES), the controller 50 instructs, via the USB PD controller 61, the external power supply 99 to terminate supplying power from the external power supply 99, and the receiving of power is terminated (S161). The controller 50 executes the steady-state operation mode setting process and changes the operation mode of the controller 50 from the second or third operation mode to the steady-state operation mode (S162). The controller 50 returns the process to the main process (see FIG. 5).

As explained above, the printing device 1 is provided with the print head 12, the battery 71, and the controller 50. The print head 12 is capable of printing on the printing medium. The battery 71 is charged with charging power and supplies power to the print head 12. The controller 50 has the multiple operation modes and is configured to operate in any one of the multiple operation modes. The controller 50 consumes the operating power corresponding to the operation mode. The printing device 1 is capable of receiving the supplied power from the external power supply 99. The external power supply 99 has multiple power profiles and outputs the powers respectively corresponding to the power profiles as the supplied powers. The supplied power is used for the charging power to charge the battery 71 and for the operating power to drive the controller 50.

The controller 50 obtains multiple power profiles from the external power supply 99 (S21). The controller 50 determines whether the supplied power corresponding to the obtained power profiles is greater than or equal to the total power, which is the sum of the charging power and the operating power (S22). The controller 50 determines one of the first operation mode, the second operation mode, or the third operation mode as the operation mode when the battery 71 is charged (S36, S52, S53), depending on the result of the determination in S22.

In this case, the printing device 1 changes the operation mode of the controller 50 based on the relationship between the supplied power that can be received from the external power supply 99 and the total power, which is large or small. The controller 50 operates with the operating power corresponding to the changed operation mode. The above configuration enables the printing device 1 to suppress a decrease in the charging power of the battery 71 in accordance with the supplied power. Therefore, the printing device 1 can control an increase in the time required to charge the battery 71.

In the printing device 1, the controller 50 has the communication I/F 58 capable of performing the communication function. The controller 50 can perform the communication function using the communication I/F 58 when the amplitude of the total power is smaller than the amplitude of the supplied power. When the amplitude of each of the supplied powers corresponding to the power profiles obtained from the external power supply 99 is smaller than the amplitude of the total power (S22: NO), the controller 50 changes its operation mode to the second operation mode or the third operation mode in which mode the communication function cannot be performed. In this way, the printing device 1 restricts the execution of the function of the controller 50 when any of the supplied powers corresponding to the power profiles obtained from the external power supply 99 is smaller than the total power. Accordingly, the operating power is reduced and the printing device 1 can restrain the charging power of the battery 71 from dropping in accordance with the supplied power. Therefore, the printing device 1 can suppress the increase of the time required to charge the battery 71.

In the printing device 1, the controller 50 has the CPU 51. The CPU 51 is configured to obtain the voltage of the battery 71 from the voltage detector 72 at particular intervals. When any of the supplied powers corresponding to the power profiles obtained from the external power supply 99 is greater than the total power (S22: YES), the controller 50 operates in the first operation mode in which the controller 50 obtains the voltage of the battery 71 at 100-millisecond intervals (S36). When all the supplied powers corresponding to the power profiles obtained from the external power supply 99 are less than the total power (S22: NO), the controller 50 operates in the second operation mode (S52) or the third operation mode (S53). In the second operation mode, the CPU 51 obtains the voltage of the battery 71 at an interval of one-half of the charging time, and in the third operation mode, the CPU 51 obtains the voltage of the battery 71 at an interval of one-tenth of the charging time.

The charging time is an estimate of the time from the time the external power supply 99 is connected to the USB connector 91 and the battery 71 starts charging to the time when the charging of the battery 71 is completed. The charging time is about several hundred seconds. Therefore, the interval at which the controller 50 obtains the voltage of the battery 71 is longer in the second or third operation mode than in the first operation mode. As a result, the operating power is lower in the second operation mode or the third operation mode than in the first operation mode. Accordingly, the printing device 1 is capable of suppressing a decrease in the charging power of the battery 71 due to the operating power. Therefore, the printing device 1 can suppress the increase in time required to charge the battery 71.

In the printing device 1, the controller 50 has the low-speed clock 57. When any of the supplied powers corresponding to the power profiles obtained from the external power supply 99 is greater than the total power (S22: YES), the controller 50 operates in the first operation mode and supplies power to the CPU 51 to operate constantly. When any of the supplied powers corresponding to the power profiles obtained from the external power supply 99 is less than the total power (S22: NO), the controller 50 operates in the second operation mode or the third operation mode so as to temporarily stop supplying power to the CPU 51 (S122). The controller 50 supplies power to the CPU 51 (S132) in response to the low-speed clock 57 transmitting the signal at the clock signal interval (S131: YES). After displaying the remaining time on the LCD 11, if the voltage of the battery 71 has not reached the full charge (S151: NO), the controller 50 temporarily stops supplying power to the CPU 51 again (S122). In this manner, the printing device 1 suspends the supply of power to the CPU 51. The printing device 1 is capable of suppressing a decrease in the charging power of the battery 71 because the operating power of the controller 50 is reduced. Therefore, the printing device 1 can suppress the increase in the time required to charge the battery 71.

In the printing device 1, when any of the supplied powers corresponding to the power profiles obtained from the external power supply 99 is less than the total power (S22: NO), the controller 50 determines whether or not it is immediately after printing by the print head 12 (S51). When it is not immediately after printing with the print head 12 (S51: NO), the controller 50 operates in the second operation mode (S52). When it is immediately after printing with the print head 12 (S51: YES), the controller 50 operates in the third operation mode (S53). The clock signal interval of the third operation mode is longer than the clock signal interval of the first operation mode, and shorter than the clock signal interval of the second operation mode. In the printing device 1, when the battery 71 is charged immediately after printing, the time required to charge the battery 71 is reduced due to temporary recovery from the voltage. Since the clock signal interval of the third operation mode is longer than the clock signal interval of the first operation mode and shorter than the clock signal interval of the second operation mode, the printing device 1 restrains the time for charging the battery 71 from becoming excessively long, while reducing the operating power of the controller 50. Therefore, the printing device 1 can suppress overcharging due to an excess of time to charge the battery 71 when the battery 71 is charged immediately after printing.

The printing device 1 is provided with the USB connector 91 and is connected to the external power supply 99 via the cable 98, which is compliant with the USB standard. The external power supply 99 supplies power to the printing device 1 via the USB connector 91. In this case, the printing device 1 is capable of restraining the charging power of the battery 71 from dropping in accordance with the supplied power, even when only limited power is supplied via the USB connector 91. Therefore, the printing device 1 can suppress the increase in the time required to charge the battery 71.

In the above embodiment, the CPU 51 executing S21 is an example of a "supplied power obtaining device" according to aspects of the present disclosures, and the CPU 51 executing S22 is an example of a "comparing part" according to aspects of the present disclosures. Further, the CPU 51 executing S36, S52, and S53 is an example of a "mode determining part" according to aspects of the present disclosures. The communication function performed by the communication I/F 58 is an example of a "particular function" according to aspects of the present disclosures. Furthermore, the CPU 51 executing S83, S134 is an example of a "battery voltage obtaining part" according to aspects of the present disclosures. The clock signal interval for the first operation mode stored in the operation mode table 82 is an example of a "first interval" according to aspects of the present disclosures, and the clock signal interval for the second operation mode stored in the operation mode table 82 is an example of a "second interval" according to aspects of the present disclosures. The slow clock 57 is an example of a "clock part" according to aspects of the present disclosures. The CPU 51 executing S51 is an example of a "time determining part" according to aspects of the present disclosures. The clock signal interval for the third operation mode stored in the operation mode table 82 is an example of a "third interval" according to aspects of the present disclosures. The USB connector 91 is an example of a "USB port" according to aspects of the present disclosures.

The present disclosures should not be limited to the above-described embodiment, and various changes may be made within aspects of the present disclosures. For example, the following modifications may be added as needed. The following modifications may be combined as appropriate.

Each processing step of the printing device 1 should not be limited to those executed by the CPU of each device but may be partially or fully executed by other electronic devices (e.g., an ASIC). Each processing step of the printing device 1 may be processed by multiple electronic devices (e.g., multiple CPUs) in a distributed manner.

In the above embodiment, the controller 50 is configured to obtain the power profiles from the external power supply 99 via the USB PD controller 61 (S21) and determine the supplied power (S32, S42). However, aspects of the present disclosures do not need to be limited to such a configuration. For example, at least one of the obtaining of the power profile and the determining of the supplied power may be performed by the USB PD controller 61. The USB PD controller 61 may be realized by hardware alone or may be hardware including software. When the USB PD controller 61 obtains the power profile, the USB PD controller 61 may be an example of the "supply power obtaining device" according to aspects of the present disclosures. Similarly, the determination in S22, in which the controller 50 compares the supplied power of the power profile obtained from the external power supply 99 with the total power, may be performed by the USB PD controller 61. In this case, the USB PD controller 61 is an example of the "comparing part" according to aspects of the present disclosures.

In the above embodiment, the printing device 1 connects to the external power supply 99 by the connection conforming to the USB PD standard. However, aspects of the present disclosures do not need to be limited to the above configuration. The printing device 1 may be connected to the external power supply 99 by a connection conforming to a USB BC (USB Battery Charge) or by a connection other than the USB standard. In such a case, the printing device 1 does not need to be equipped with the USB connector 91.

The operation mode of the controller 50 may have operation modes other than the steady-state operation mode and the first to third operation modes.

The operation mode of the controller 50 does not need to be limited to ones according to the above embodiments. For example, the operation mode may be an operation mode in which power is supplied to the flash memory 55 only when the flash memory 55 is synchronized with the operation of the CPU 51, and the CPU 51 is executing processes.

The clock signal intervals of the second and third operation modes may be particular values, respectively. In this case, the clock signal interval of the third operation mode may be longer than the clock signal interval of the first operation mode, and the clock signal interval of the second operation mode may be longer than the clock signal interval of the third operation mode. The CPU 51 may also monitor the voltage of the battery 71 based on time measured by a timer IC other than the high-speed clock 56 and the low-speed clock 57. In such a case, the timer IC is an example of the "clock part" according to aspects of the present disclosures.

The intervals at which the high-speed clock 56 and the low-speed clock 57 generate the clock signals may be changed as needed. The controller 50 may thwart a part of the clock signals generated by the high-speed clock 56 and the low-speed clock 57, and the CPU 51 may execute processing in synchronization with the thwarted clock signals. The printing device 1 may not be equipped with either the high-speed clock 56 or the low-speed clock 57. If the printing device 1 does not have a low-speed clock 57, the high-speed clock 56 is an example of the "clock part" according to aspects of the present disclosures.

The program including the instructions for the controller 50 (CPU 51) to execute the processing may be stored in the storage device of the device by the time each component of the printing device 1 executes the program. Accordingly, each of a program obtaining method, obtaining route, and equipment storing the program may be changed as needed. The program executed by the printing device 1 may be received from another device via a cable or wireless communication and stored in a storage device such as the flash memory 55. The other devices include, for example, a PC and a server connected via a network.

Each step of the processes of the printing device 1 can be changed in order, the steps can be omitted, and the steps can be added as needed. The manner in which an operating system (OS) or the like running on the printing device 1 performs some or all of the processes based on commands from the controller 50 that the printing device 1 has is also included in aspects of the present disclosures.

The controller 50 does not have to display the remaining time on the LCD 11. In such a case, the processing in S93, S94, S143, and S144 can be omitted. The controller 50 may display the charging time on the LCD 11 instead of the remaining time.

In the above embodiment, the controller 50 determines whether or not 300 seconds have elapsed since the end of printing with the print head 12 to determine whether or not it is immediately after printing. However, aspects of the present disclosures do not necessarily be limited to such a configuration. For example, the printing device 1 is equipped with a temperature detection device that detects the temperature of the print head 12, and the controller 50 may determine whether it is immediately after printing based on the temperature detected by the temperature detection device.

What is claimed is:

1. A printing device, comprising:
   a print head configured to perform printing on a printing medium;
   a battery configured to be charged by a supplied power which is an electrical power supplied from an external power source when the printing device is connected to the external power source, the battery being capable of supplying an electrical power to the print head; and
   a controller configured to operate in one operation mode of multiple operation modes with consuming an operating electrical power from the supplied power,
   wherein the controller is configured to perform:
   obtaining an amplitude of the supplied power from the external power source when the printing device is connected to the external power source;
   calculating an amplitude of a total power that is a sum of an electrical power to charge the battery and a particular operating electrical power, the particular operating electrical power being the operating electrical power consumed when the controller operates in a particular operation mode of the multiple operation modes,
   comparing the amplitude of the total power with the amplitude of the supplied power obtained in the obtaining; and
   determining an operation mode of the multiple operation modes when the battery is being charged based on a comparison result in the comparing.

2. The printing device according to claim 1,
   wherein the controller is configured to operate in an operation mode to perform a particular function when the amplitude of the total power is less than the amplitude of the supplied power as the comparison result in the comparing, and
   wherein, when the amplitude of the total power is greater than the amplitude of the supplied power as the comparison result in the comparing, the controller is configured to determine the operation mode at a time of charging the battery to be an operation mode restraining the particular function from being executed.

3. The printing device according to claim 1,
   wherein the controller further includes a battery voltage obtaining part configured to obtain a voltage of the battery at regular intervals,
   wherein, when the amplitude of the total power is less than or equal to the amplitude of the supplied power as the comparison result in the comparing, the controller operates in an operation mode in which the controller obtains the voltage of the battery at every first interval which is a particular one of the regular intervals, and
   wherein, when the amplitude of the total power is greater than the amplitude of the supplied power as the comparison result in the comparing, the controller is configured to determine the operation mode at the time of charging the battery as an operation mode in which the battery voltage obtaining part obtains the voltage of the battery at every second interval which is longer than the first interval.

4. The printing device according to claim 3,
   wherein the controller further includes a clock part configured to output a signal at the regular intervals,
   wherein, when the amplitude of the total power is less than or equal to the amplitude of the supplied power as the comparison result in the comparing, the controller operates in an operation mode in which the battery voltage obtaining part always operates as a part of the operating power is supplied and obtains the voltage of the battery when the clock part outputs the signal, and
   wherein, when the amplitude of the total power is greater than the amplitude of the supplied power as the comparison result in the comparing, the controller is configured to determine the operation mode at the time of charging the battery as an operation mode in which a supply of the power to the battery voltage obtaining part is stopped until the clock part outputs the signal next time.

5. The printing device according to claim 3,
   wherein the controller further includes a time determining part configured to determine, when the amplitude of the total power is greater than the amplitude of the supplied power as the comparison result in the comparing, whether a particular period has elapsed immediately after printing by the print head, and
   wherein, when the amplitude of the total power is greater than the amplitude of the supplied power as the result of comparison by the controller, and the controller determines that the particular period has not elapsed, the controller is configured to determine the operation mode at the time of charging the battery as an operation mode in which the interval at which the battery voltage obtaining part obtains the voltage of the battery to be a third interval which is longer than the first interval and shorter than the second interval.

6. The printing device according to claim 1, further comprising a USB port compliant to a USB standard, the USB port being connected to the external power source,
   wherein, at the time of charging the battery, the supplied power is supplied from the external power source via the USB port.

* * * * *